(12) United States Patent
Park et al.

(10) Patent No.: US 10,318,944 B2
(45) Date of Patent: Jun. 11, 2019

(54) NEAR FIELD COMMUNICATION TERMINAL FOR PERFORMING SECURE PAYMENT AND SECURE PAYMENT METHOD USING THE SAME

(75) Inventors: Jae Min Park, Seoul (KR); Kyoung Tae Kim, Seoul (KR)

(73) Assignee: KT Corporation, Seongnam (KR)

( * ) Notice: Subject to any disclaimer, the term of this patent is extended or adjusted under 35 U.S.C. 154(b) by 1433 days.

(21) Appl. No.: 13/333,677

(22) Filed: Dec. 21, 2011

(65) Prior Publication Data

US 2012/0166337 A1 Jun. 28, 2012

(30) Foreign Application Priority Data

Dec. 23, 2010 (KR) .................. 10-2010-0133733

(51) Int. Cl.
*G06Q 20/20* (2012.01)
*G06Q 20/40* (2012.01)
*G06Q 20/32* (2012.01)

(52) U.S. Cl.
CPC ......... *G06Q 20/20* (2013.01); *G06Q 20/3278* (2013.01); *G06Q 20/40* (2013.01)

(58) Field of Classification Search
CPC .... G06K 19/06; G06Q 20/00; G06Q 20/3278; G06Q 20/20; G06Q 20/40
USPC .......................... 235/492; 705/16, 17, 50–79
See application file for complete search history.

(56) References Cited

U.S. PATENT DOCUMENTS

| | | | |
|---|---|---|---|
| 8,109,444 B2 * | 2/2012 | Jain | G06K 19/07739 235/492 |
| 8,923,827 B2 * | 12/2014 | Wentker | G06Q 20/10 455/414.1 |
| 2008/0076475 A1 * | 3/2008 | Kim | G06K 7/10237 455/558 |

(Continued)

FOREIGN PATENT DOCUMENTS

| | | |
|---|---|---|
| KR | 20090011783 A | 2/2009 |
| KR | 20090079444 A | 7/2009 |

(Continued)

OTHER PUBLICATIONS

"Mobile Payments", (downloaded from https://www.securetechalliance.org/resources/pdf/Security_of_Proximity_Mobile_Payments.pdf and attached as PDF file (Year: 2009).*

(Continued)

*Primary Examiner* — James D Nigh
*Assistant Examiner* — Margaret M Neubig
(74) *Attorney, Agent, or Firm* — Sughrue Mion, PLLC

(57) ABSTRACT

A Near Field Communication (NFC) terminal for performing secure payment includes an NFC unit and a control unit. The NFC unit communicates with an external payment terminal and the payment unit transmits results obtained by processing transaction information and an electronic signature value of the transaction information to the payment terminal using the NFC unit. The payment terminal requests an external payment server to perform payment. An authentication certificate applet included in the payment unit generates the electronic signature value of the transaction information. An electronic wallet applet included in the payment unit transmits the results obtained by processing the transaction information and the electronic signature value to the payment terminal.

6 Claims, 4 Drawing Sheets

(56) References Cited

U.S. PATENT DOCUMENTS

| | | | | |
|---|---|---|---|---|
| 2009/0030843 A1* | 1/2009 | Hoffman | ................ | G06Q 20/04 |
| | | | | 705/67 |
| 2009/0248582 A1* | 10/2009 | Barthelemy | ........... | G06Q 20/02 |
| | | | | 705/71 |
| 2011/0078031 A1* | 3/2011 | Mardikar | ............... | G06Q 20/20 |
| | | | | 705/17 |
| 2011/0258443 A1* | 10/2011 | Barry | ...................... | G06F 21/31 |
| | | | | 713/168 |
| 2012/0095852 A1* | 4/2012 | Bauer | .................. | G06O 20/105 |
| | | | | 705/16 |

FOREIGN PATENT DOCUMENTS

| | | |
|---|---|---|
| KR | 20100013246 A | 2/2010 |
| KR | 20100060707 A | 6/2010 |

OTHER PUBLICATIONS

KR 10-2010-0133733 Office Action dated Jan. 5, 2017.

* cited by examiner

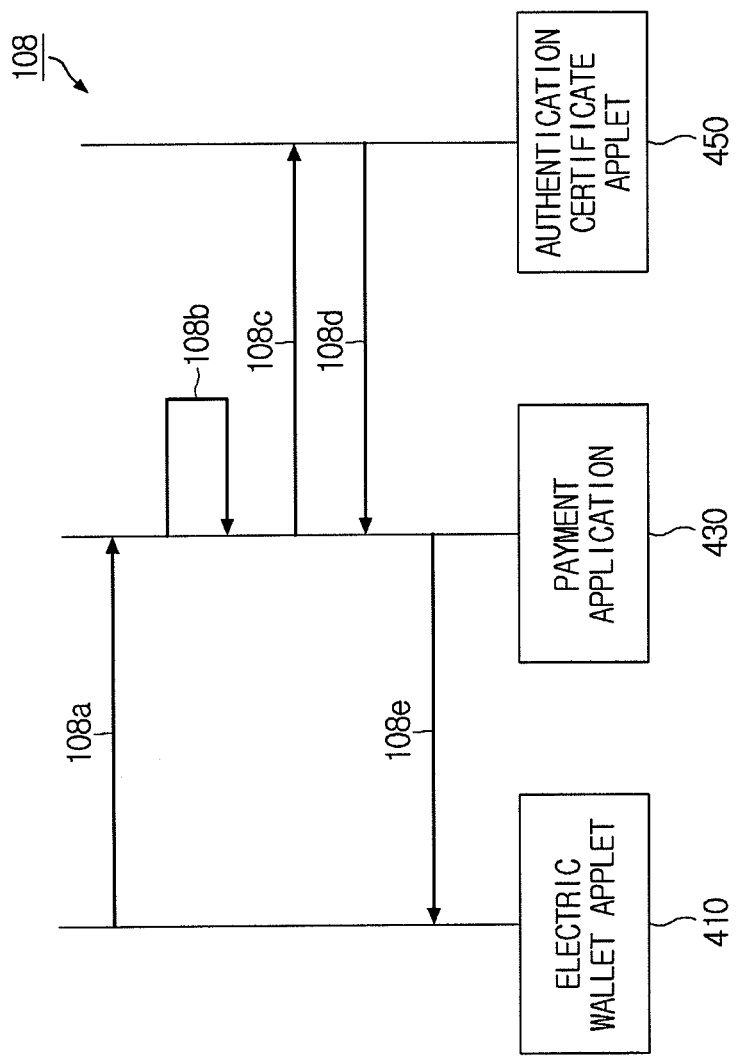

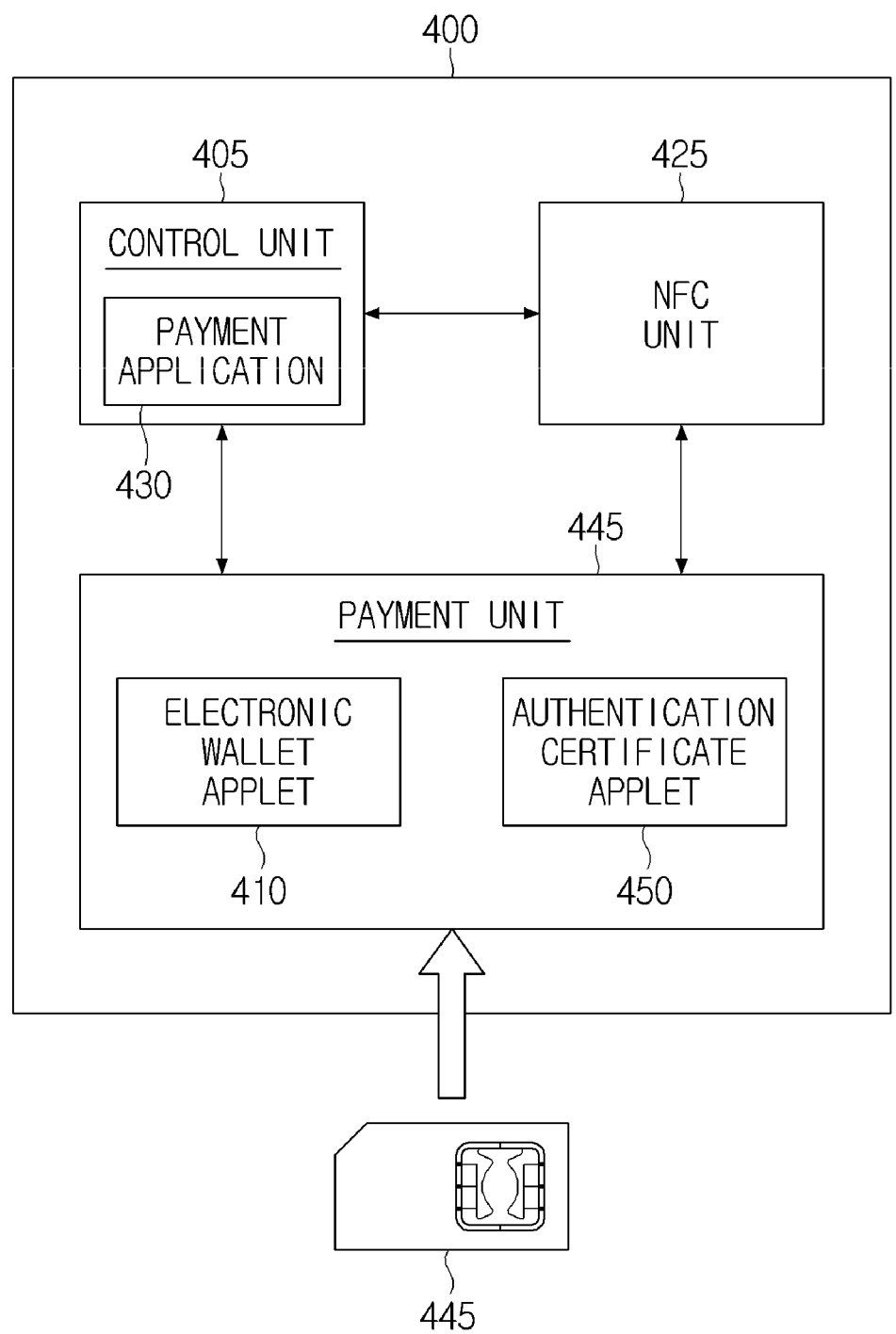

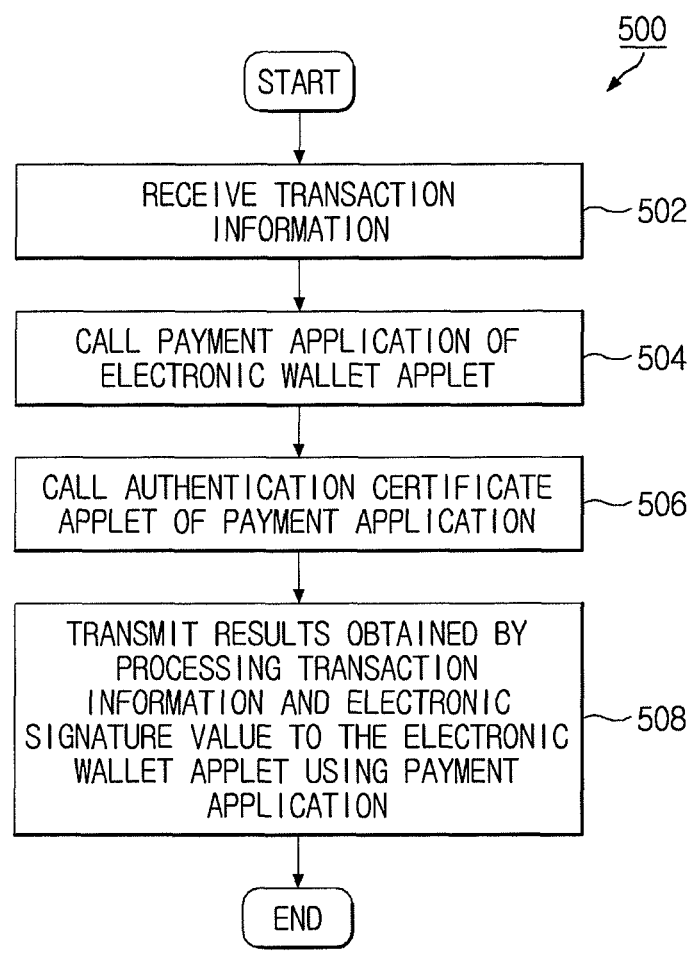

NEAR FIELD COMMUNICATION TERMINAL FOR PERFORMING SECURE PAYMENT AND SECURE PAYMENT METHOD USING THE SAME

CROSS REFERENCE TO RELATED APPLICATION

This application claims priority from Korean Patent Application No. 10-2010-0133733, filed on Dec. 23, 2010 in the Korean Intellectual Property Office, the disclosure of which is hereby incorporated by reference in its entirety.

BACKGROUND

1. Field

Methods and apparatuses consistent with exemplary embodiments relate to a mobile communication terminal, and, more particularly, to a Near Field Communication (NFC) terminal for performing secure payment and a secure payment method using the same.

2. Description of the Related Art

Generally, when payment is performed in a store or a restaurant, the payment is made using credit cards and/or cash. Payment by credit card is performed in such a way that each store is provided with a payment terminal connected to one or more credit card companies via a wired network, and a credit card is read using the reader of the payment terminal.

Recently, in addition to payment using a credit card, payment methods using mobile phones through contactless Radio Frequency (RF) access apparatuses have been proposed and commercialized. Further, a method of providing an RF module in a credit card, such that contactless-type payment can be performed, has been proposed.

Meanwhile, when payment is performed using a mobile phone and a payment amount is equal to or greater than a specific amount (for example, 300,000 won) or when there is a request by a credit card service provider, an electronic signature may be necessary at offline stores.

SUMMARY

Accordingly, keeping in mind the above problems occurring in the conventional methods, aspects of the exemplary embodiments provide an NFC terminal for performing secure payment and a secure payment method using the same, which enable an electronic signature to be simply written offline.

In accordance with an aspect of an exemplary embodiment, there is provided a Near Field Communication (NFC) terminal for performing secure payment, including: an NFC unit that communicates with an external payment terminal; and a payment unit that processes transaction information and an electronic signature value of the transaction information and transmits a result of processing the transaction information and the electronic signature value of the transaction information to the external payment terminal through the NFC unit.

An authentication certificate applet included in the payment unit generates the electronic signature value of the transaction information, and an electronic wallet applet included in the payment unit transmits the result of processing the transaction information and the electronic signature value to the external payment terminal through the NFC unit.

The NFC terminal may further include a control unit that controls operations of the NFC unit and operations of the payment unit, the control unit comprising a payment application. The electronic wallet applet calls the payment application and transmits the transaction information received from the payment terminal to the payment application. The payment application provides a User Interface (UI) that receives a password of an authentication certificate input by a user of the NFC terminal. The payment application obtains the electronic signature value from the authentication certificate applet using the password of the authentication certificate, generates the result of processing the transaction information, and transmits the result of processing the transaction information and the electronic signature value to the electronic wallet applet.

The payment terminal may encrypt the results obtained by processing the transaction information and the electronic signature value which were received from the electronic wallet applet, and transmit the encrypted results obtained by processing the transaction information and electronic signature value to the payment server.

In accordance with an aspect of an exemplary embodiment, there is provided an NFC terminal for performing secure payment, including: an NFC unit that communicates with an external payment terminal; a payment unit that processes transaction information and an electronic signature value of the transaction information and transmits a result of processing the transaction information and the electronic signature value of the transaction information to the external payment terminal using the NFC unit; and a control unit that controls operations of the NFC unit and operations of the payment unit.

The payment unit may include an authentication certificate applet and a payment application, and the electronic wallet applet, authentication certificate applet, and payment application transmit the results obtained by processing the transaction information and the electronic signature value to the payment terminal.

In accordance with an aspect of an exemplary embodiment, there is provided an NFC terminal for performing secure payment, including: an NFC unit that communicates with an external payment terminal; a payment unit that processes transaction information and an electronic signature value of the transaction information and transmits a result of processing the transaction information and the electronic signature value of the transaction information to the external payment terminal using the NFC unit; and a control unit that controls operations of the NFC unit and operations of the payment unit.

The payment unit may include an electronic wallet applet. The control unit may include a payment application that requests an authentication certificate applet included in the payment unit to generate the electronic signature value of the transaction information. The payment application may transmit the result of processing the transaction information and the electronic signature value to the electronic wallet applet. The electronic wallet applet may transmit the results obtained by processing the transaction information and the electronic signature value to the payment terminal.

In accordance with an aspect of an exemplary embodiment, there is provided a secure payment method using an NFC terminal, including calling a payment application of a control unit of the NFC terminal using an electronic wallet applet of a payment unit of the NFC terminal that receives transaction information from an external payment terminal, and transmitting the transaction information to the payment application using the electronic wallet applet; calling an authentication certificate applet of the payment unit using the payment application, and generating an electronic signature value of the transaction information using the authentication certificate applet; and generating a result of processing the transaction information, and transmitting the generated result of processing the transaction information and the electronic signature value to the electronic wallet applet using the payment application. The results obtained by processing the transaction information and the electronic signature value may be transmitted to the payment terminal.

The calling the authentication certificate applet may further include providing a user interface that receives a password of an authentication certificate input by a user of the NFC terminal using the payment application.

The payment terminal may encrypt the result of processing the transaction information and the electronic signature value which were received from the electronic wallet applet, and transmit the encrypted results to the payment server.

BRIEF DESCRIPTION OF THE DRAWINGS

The above and other aspects of the exemplary embodiments will be more clearly understood from the following detailed description, taken in conjunction with the accompanying drawings, in which:

FIG. 2 is a view illustrating the exemplary operation of the NFC terminal of FIG. 1 for performing secure payment;

FIG. 3 is a block diagram illustrating the NFC terminal for performing secure payment according to an exemplary embodiment; and FIG. 4 is a flowchart illustrating a secure payment method using an NFC terminal according to an exemplary embodiment.

DETAILED DESCRIPTION OF EXEMPLARY EMBODIMENTS

Figure 1:
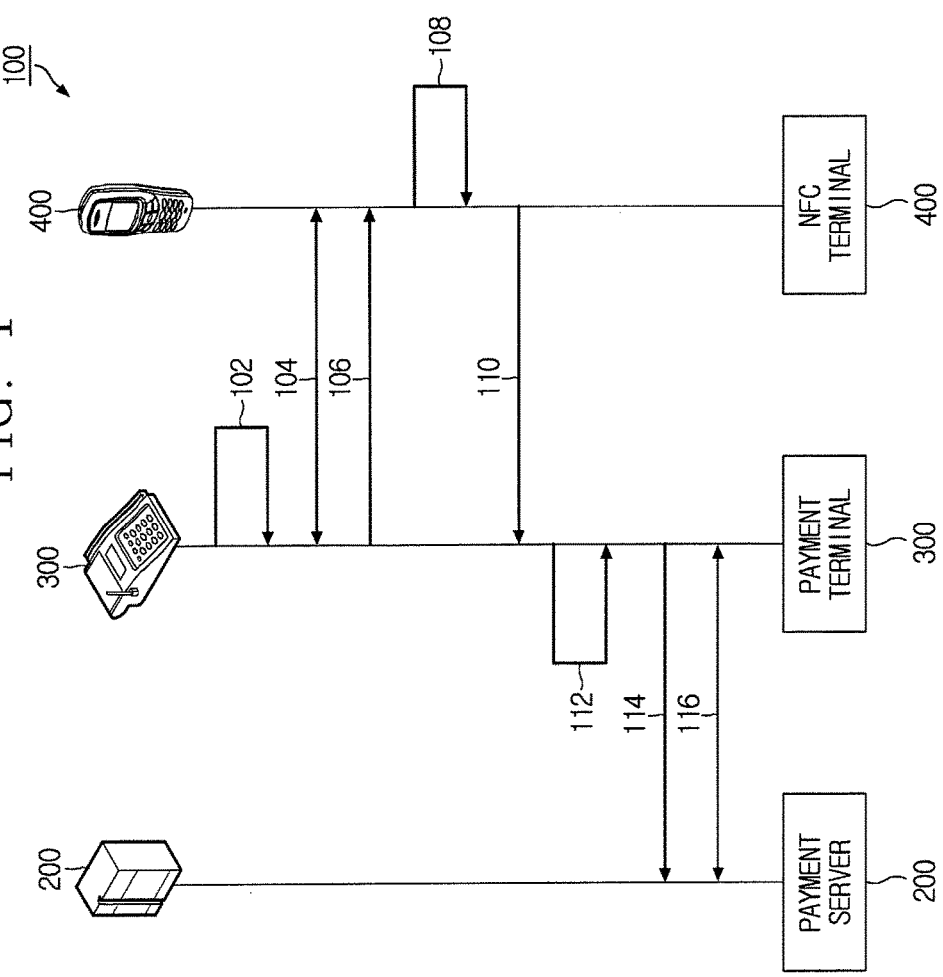
FIG. 1 is a view illustrating a secure payment method using an NFC terminal according to an exemplary embodiment.

In order to sufficiently understand the present application, reference should be made to the accompanying drawings which illustrate exemplary embodiments.

Hereinafter, exemplary embodiments will be described in detail with reference to the attached drawings, in which the same reference numerals are used throughout the different drawings to designate the same or similar components.

FIG. 1 is a view illustrating a secure payment method 100 using a Near Field Communication (NFC) terminal according to an exemplary embodiment. FIG. 2 is a view illustrating the exemplary operation 108 of the NFC terminal 400 of FIG. 1 for performing secure payment.

Referring to FIGS. 1 and 2, the secure payment method 100 using an NFC terminal will be described below.

Referring to FIG. 1, the secure payment method 100 using an NFC terminal is performed by connecting a payment server 200 included in the payment infrastructure of a financial institution or a credit card service provider, a payment terminal 300 such as a payment dongle (mobile phone payment recognizer) at a store, and an NFC terminal 400. The payment dongle may be provided to a department store, a major mall, a convenient store, a member store, and the like.

At an input step 102, when a payment amount which is equal to or greater than a specific amount of money (for example, 300,000 won) is input to the payment terminal 300 by a staff member of a store, input of an electronic signature may be requested, or, when a product (item) is paid for, the input of an electronic signature to the payment terminal 300 may be requested by a credit card service provider to which the purchaser of the corresponding product has subscribed.

At a communication step 104, the payment terminal 300 and the NFC terminal 400 perform NFC. In detail, a communication unit of the payment terminal 300 requests payment by communicating with the NFC chip of the NFC terminal 400 and selecting an electronic wallet applet included in an NFC Universal Subscriber Identity Module (USIM) card of the NFC terminal 400. The USIM card may be a payment unit or module of the NFC terminal 400. In response to the payment request, the electronic wallet applet of the NFC terminal 400 is driven and the electronic wallet applet requests transaction information.

At transmission step 106, the payment terminal 300 transmits the transaction information (a hashed value) regarding the product to the electronic wallet applet of the NFC terminal 400 using the communication unit of the payment terminal 300 at the request of the electronic wallet applet for the transaction information.

FIG. 2 illustrates an operation of the NFC terminal 400 performing the secure payment in step 108. The NFC terminal 400 includes an electronic wallet applet 410, a payment application 430, and an authentication certificate applet 450. The electronic wallet applet 410, the payment application 430, and the authentication certificate applet 450 operate in a state in which they are connected to and communicate with each other. The electronic wallet applet 410 and the authentication certificate applet 450 may be pieces of software that are embedded in the NFC USIM card, which is inserted (installed) into the NFC terminal 400, or may be configured (implemented) using a java card platform. The payment application 430 corresponds to software executed by a control unit of the NFC terminal 400 and used to perform electronic payment. Various types of java cards, such as a personal finance card, a credit card, a traffic card, and a medical card, may be used in various fields.

At call step 108a, the electronic wallet applet 410 calls a payment application (or terminal application) 430 using connectivity in conformity with Human-Computer Interaction (HCI), and transmits the transaction information related to the target of the electronic signature to the payment application 430. For example, a java card Application Program Interface (API) may be used as an interface used when calling the payment application.

At input step 108b, a user of the NFC terminal 400 inputs the password of an authentication certificate using the User Interface (UI) of the terminal, which is provided by the payment application 430.

At request step 108c, the payment application 430 calls the authentication certificate applet 450 based on the authentication certificate password input at input step 108b, and requests the electronic signature of the transaction information of the authentication certificate applet 450.

At obtainment step 108d, the payment application 430 obtains an electronic signature value, which was requested at request step 108c, from the authentication certificate applet 450.

At response step 108e, the payment application 430 processes the transaction information, generates results related to the transaction information, and responds (transmits) the results related to the transaction information and the electronic signature value to the electronic wallet applet 410.

Application Protocol Data Unit (APDU) communication may be used for data communication performed between the electronic wallet applet 410, the authentication certificate applet 450, and the payment application 430. The electronic wallet applet 410 and the authentication certificate applet 450 are provided in a USIM card.

For example, an Application Program Interface (API) may be used as an interface used to call the electronic wallet applet 410, the payment application 430, and the authentication certificate applet 450.

Referring to FIG. 1 again, at response step 110, the electronic wallet applet 410 of the NFC terminal 400 responds with (transmits) the results obtained by processing the transaction information and the electronic signature value to the payment terminal 300 via the NFC unit of the NFC terminal 400.

At encryption step 112, the payment terminal 300 may generate original transaction information including the electronic signature value using the results obtained by processing the transaction information and the electronic signature value, which were received at response step 110, and may then encrypt the original transaction information. Here, the payment terminal 300 may encrypt the original transaction information using an encryption program, for example, the public-key cryptography system (PKCS) #7.

At request step 114, the payment terminal 300 requests payment by transmitting the encryption value (USIM information) of the original transaction information, generated at encryption step 112, to the payment server 200 of a financial institution (bank) or a credit card service provider (credit card company).

At approval step 116, the payment server (or a web server) 200 checks and approves the encryption value at request step 114, and then transmits the results of payment to the payment terminal 300 in response to the payment request at request step 114.

The payment terminal 300 may communicate with the payment server 200 via, for example, an Access Point (AP), a base station, or a wireless or wired Internet network.

FIG. 3 is a block diagram illustrating the NFC terminal 400 for performing secure payment according to an exemplary embodiment.

Referring to FIG. 3, the NFC terminal 400 includes a control unit 405, an NFC unit 425, and a payment unit 445. The NFC terminal 400 may be for example a mobile phone, such as a smart phone, or a Personal Digital Assistant (PDA).

The NFC unit 425 communicates with a payment terminal (300 of FIG. 1) provided outside the NFC terminal 400, and may be implemented using an NFC chip. The NFC chip is a chip that may function as a Radio Frequency Identification (RFID) reader at a band of, for example, 13.56 MHz, in addition to a tag at the same time, and the NFC chip enables near field data communication to be performed.

The NFC unit 425 may include a radio frequency antenna and an NFC chip (NFC module) for near field communication. The near field (short range) communication is one of mobile RFID technologies, which enable communication between mutual apparatuses. When a mobile phone to which an NFC technology is provided comes into contact with a payment apparatus, authentication and payment may be performed.

NFC is a short-range wireless communication technology and is one type of mobile RFID. Although NFC is similar to T-money service using a USIM card, NFC allows read/write functions, thereby enabling bidirectional data transmission.

The payment unit 445 is provided within a USIM, which is a security module (subscriber authentication module). Such a USIM is provided in a form in which a SIM card, including subscriber information, is combined with a Universal IC Card (UICC), and enables various functions, such as user authentication, global roaming, and electronic commerce, to be implemented using a single card. A USIM is mounted on a mobile terminal corresponding to 3rd Generation Wideband Code Division Multiple Access (WCDMA).

The payment unit 445 transmits the results obtained by processing the transaction information and the electronic signature value of the transaction information to the payment terminal using the NFC unit 425 such that the external payment terminal (300 of FIG. 1) requests the payment from the external payment server (200 of FIG. 1). The payment terminal encrypts the results obtained by processing the transaction information and the electronic signature value, which were received from the electronic wallet applet 410, and then transmits the encrypted results and electronic signature value to the payment server (200 of FIG. 1).

The payment unit 445 includes the electronic wallet (or digital wallet) applet 410 and the authentication certificate applet 450. The electronic wallet applet 410 or the authentication certificate applet 450 may be stored in the internal memory (e.g., RAM, ROM, flash memory, etc.) (not shown) of the payment unit 445. FIG. 3 illustrates the form of the NFC USIM card 445 that is installed (inserted) into the NFC terminal 400. The USIM card 445 may correspond to the payment unit 445.

Such a USIM card (or a smart card) is provided with a memory, various types of application programs, and a microprocessor that transmits and receives data according to an interface method in conformity with International Standardization Organization (ISO) 7816. Such a USIM card may be an electronic wallet, a credit card, a medical card, or a SIM card, which provides functions of portability, convenience, and security in fields that need high-level security.

The electronic wallet applet 410 calls the payment application 430 included in the control unit 405, and transmits the transaction information received from the payment terminal to the payment application 430. The electronic wallet applet 410 transmits the results obtained by processing the transaction information using the payment application 430 and the electronic signature value of the transaction information to the payment terminal using the NFC unit 425. According to another exemplary embodiment, the NFC unit 425 and the payment unit 445 may directly exchange data signals under the control of the control unit 405 instead of exchanging data signals using the control unit 405, as shown in FIG. 3.

The authentication certificate applet 450 generates the electronic signature value of the transaction information about a product at the request of the payment application 430. An authentication certificate is issued and stored in the authentication certificate applet 450.

The control unit 405 corresponds to an NFC control chip that performs the functions of a Central Processing Unit (CPU), and may control the operations of the NFC unit 425 and the payment unit 445. The control unit 405 is provided with the payment application 430. The payment application 430 may be referred to as a credit card application.

The payment application 430 may provide a user interface such that the password of the authentication certificate is input by a user.

The payment application 430 obtains the electronic signature value from the authentication certificate applet 450 using the password of the authentication certificate, generates the results obtained by processing the transaction information, and then transmits the results obtained by processing the transaction information and the electronic signature value of the transaction information to the electronic wallet applet 410. The payment application 430 requests the authentication certificate applet 450 to generate the electronic signature value of the transaction information.

As described above, according to the exemplary embodiment, the electronic wallet applet 410, the authentication certificate applet 450, and the payment application 430 may generate the results obtained by processing the transaction information and the electronic signature value of the transaction information and then transmit the results obtained by processing the transaction information and the electronic signature value of the transaction information to the payment terminal while the electronic wallet applet 410, the authentication certificate applet 450, and the payment application 430 are coupled to each other.

The NFC terminal 400 may further include a chip that performs the function of a mobile phone, such as a smart phone or a PDA, in addition to the above-described elements, thereby being used as a mobile phone or a PDA.

FIG. 4 is a flowchart illustrating a secure payment method 500 using an NFC terminal according to an exemplary embodiment. The secure payment method 500 using an NFC terminal may be applied to the payment server, the payment terminal, and the NFC terminal of FIGS. 1 and 2 or the NFC terminal of FIG. 3.

Referring to FIG. 4, at reception step 502, the electronic wallet applet included in the payment unit of the NFC terminal receives transaction information about a product from an external payment terminal via near field communication.

At call step 504, the electronic wallet applet calls the payment application included in the control unit of the NFC terminal, and transmits the transaction information to the payment application.

At call step 506, the payment application calls the authentication certificate applet included in the payment unit, and the called authentication certificate applet generates the electronic signature value of the transaction information. At call step 506, the payment application may provide a user interface such that the password of the authentication certificate is input by the user of the NFC terminal, thereby calling the authentication certificate applet.

At transmission step 508, the payment application generates results obtained by processing the transaction information and transmits the results obtained by processing the transaction information and the electronic signature value to the electronic wallet applet. The results obtained by processing the transaction information and the electronic signature value which were transmitted to the electronic wallet applet may be transmitted to the payment terminal.

The payment terminal encrypts the results obtained by processing the transaction information and the electronic signature value which were received from the electronic wallet applet, and then transmits the encrypted results and electronic signature value to an external payment server.

Meanwhile, the above-described method according to may be embodied as computer-readable codes of a computer program. Further, the codes and code segments that constitute the computer program may be easily deduced by computer programmers in the art. The computer program may be stored in a computer-readable recording medium (information storage medium), and read and executed by a computer, thereby implementing the method. Further, the recording medium may include all types of recording media that can be read by a computer, such as a memory (RAM, ROM, flash memory, etc.), CD-ROM, or the like.

The NFC terminal for performing secure payment and the secure payment method using the same may generate the electronic signature value of transaction information by coupling an electronic wallet applet, a payment application, and an authentication certificate applet which are provided in the NFC terminal, so that a product purchaser who is the user of the NFC terminal may simply write an electronic signature (or a digital signature), thereby paying for the product offline. For example, when a payment is performed using a payment terminal such as a dongle at a store, a payment service that requires an electronic signature may be easily performed.

Further, the NFC terminal for performing secure payment and the secure payment method using the same use an authentication certificate applet in which an authentication certificate is stored, so that products can be safely paid for when the products are purchased by reducing the danger of leaking of information and preventing illegal use or falsification of private information, and so that the leaking of personal information attributable to the use of a payment terminal, such as a wireless dongle, can be minimized.

Although the exemplary embodiments have been disclosed for illustrative purposes, those skilled in the art will appreciate that various modifications, additions, and substitutions are possible, without departing from the scope and spirit of the invention as disclosed in the accompanying claims.

What is claimed is:

1. A Near Field Communication (NFC) terminal for performing secure payment processing of financial transactions, the terminal comprising:
   an NFC chip;
   a central processor programmed to execute payment application;
   a Universal Subscriber Identity Module (USIM) card comprising:
      a memory storing an electronic wallet applet and an authentication certificate applet; and
      a USIM processor;
   wherein the NFC chip is programmed to:
      receive transaction information from a payment terminal via NFC;
      transmit the transaction information to the electronic wallet applet executed by the USIM processor;
      receive processed transaction information and an electronic signature value from the electronic wallet applet executed by the USIM processor; and
      transmit to the payment terminal the processed transaction information and the electronic signature value of the transaction information;
   wherein the electronic wallet applet when executed by the USIM processor causes the USIM processor to:
      receive the transaction information from the NFC chip;
      call the payment application executed by the central processor and transmit the transaction information to the payment application executed by the central processor;
      receive the processed transaction information and the electronic signature value of the transaction information from the payment application executed by the central processor; and transmit the processed transaction information and the electronic signature value of the transaction information to the NFC chip;

wherein the authentication certificate applet executed by the USIM processor causes the processor to:
receive a request for the electronic signature value of the transaction information from the payment application executed by the control processor;
generate the electronic signature value of the transaction information;
transmit the electronic signature value of the transaction information to the payment application executed by the control processor;

wherein the payment application when executed by the control processor causes the control processor to:
upon receiving the call from the electronic wallet applet executed by the USIM processor, provide a User Interface (UI);
receive a user password from a user via the UI;
in response to receiving the user password, send the request for the electronic signature value of the transaction information to the authentication certificate applet executed by the USIM processor;
receive the electronic signature value of the transaction information from the authentication certificate applet executed by the USIM processor;
process the transaction information; and
transmit the processed transaction information and the electronic signature value to the electronic wallet applet executed by the USIM processor.

2. The NFC terminal as set forth in claim 1, wherein, upon execution, the electronic wallet applet causes the processor of the USIM card to perform the steps of:
calling the payment application executed by the central processor using Human-Computer interaction (HCI), and
transmitting the transaction information received from the payment terminal to the payment application using Application Protocol Data Unit (APDU) communication.

3. The NFC terminal as set Forth in claim 1, wherein upon execution the electronic wallet applet causes the processor of the USIM card to perform the steps of calling the payment application included in the central processor using connectivity in conformity with Human-Computer Interaction (HCI) and transmitting the transaction information received from the payment terminal to the payment application using Application Protocol Data Unit (APDU) communication, and,
wherein upon execution the payment application causes the central processing unit to perform the step of requesting the authentication certificate applet to generate the electronic signature value of the transaction information.

4. The NFC terminal as set forth in claim 1, wherein the chip is an NFC chip that operates as at least one of a radio frequency identification (RFID) reader and an RFID tag.

5. The NFC terminal as set forth in claim 1, wherein data communication between the electronic wallet applet, the authentication certificate applet and the payment application is the APDU (Application Protocol Data Unit) communication.

6. The NFC terminal as set forth in claim 1, wherein the NFC chip and the USIM card directly exchange data signals.

* * * * *